United States Patent [19]

Schuman

[11] 3,925,536

[45] Dec. 9, 1975

[54] METHOD OF RECOVERING URANIUM HEXAFLUORIDE

[75] Inventor: Seymour Schuman, Nutley, N.J.

[73] Assignee: The United States of America as represented by the United States Energy Research and Development Administration, Washington, D.C.

[22] Filed: June 19, 1947

[21] Appl. No.: 755,755

[52] U.S. Cl. .................... 423/258; 423/2; 423/19
[51] Int. Cl.$^2$ ................................ C01G 43/06
[58] Field of Search............... 183/4.2, 115.7, 114.2; 262/442; 423/258, 2, 19

[56] References Cited
UNITED STATES PATENTS 2,300,235   10/1942   Pines, et al. ............... 183/114.2 X

FOREIGN PATENTS OR APPLICATIONS 260,914   11/1926   United Kingdom................. 183/4.2

*Primary Examiner*—Benjamin R. Padgett
*Assistant Examiner*—R. E. Schafer
*Attorney, Agent, or Firm*—Dean E. Carlson; Leonard Belkin

EXEMPLARY CLAIM

1. A method of recovering uranium hexafluoride from gaseous mixtures which comprises adsorbing said uranium hexafluoride on activated carbon.

9 Claims, 1 Drawing Figure

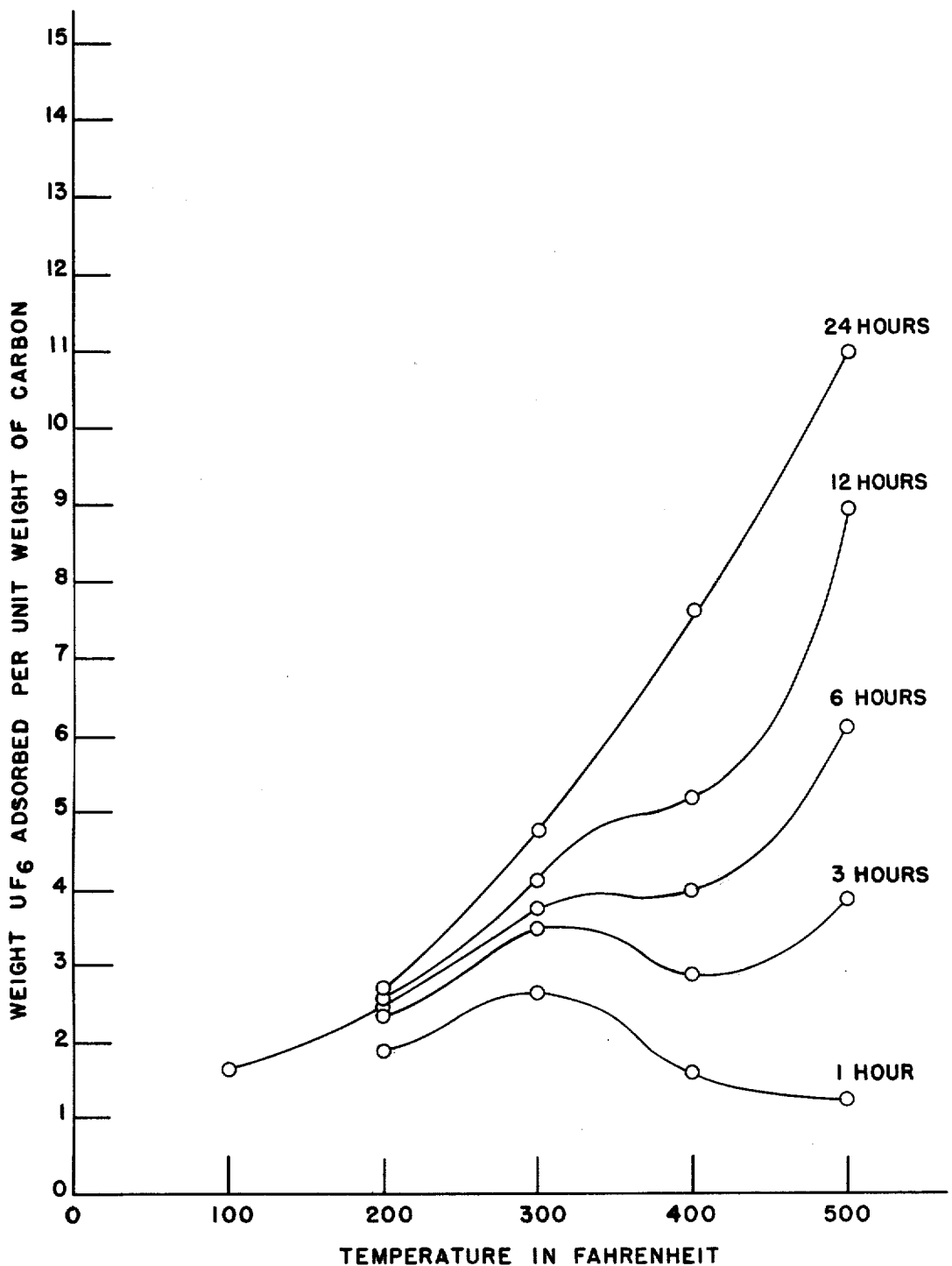

METHOD OF RECOVERING URANIUM HEXAFLUORIDE

The present invention relates to a method of recovering uranium hexafluoride from gaseous mixtures.

In recent years considerable attention has been devoted to gas separation processes of the type wherein components of a gaseous mixture are separated by diffusion. Attention has been devoted particularly to the separation of gaseous mixtures containing or comprising the isotopes of uranium. Such diffusion separation processes for the separation of the isotopes of uranium necessarily involve the employment of a gaseous compound of uranium in large quantities. Of the various compounds of uranium which might be used, uranium hexafluoride has been found to be the most practical because it is a vapor at relatively low temperatures (i.e., 65°C. and 1 atmosphere) and the fluoride component of the compound does not interfere with the separation since it has no isotopes. The absence of isotopes other than the uranium isotopes is important because the diffusive separation operates to separate the molecules according to their molecular weight, not according to the molecular weight of a single component. Thus, for example, if the compound $UCl_6$ were used the chlorine isotopes $Cl^{35}$ and $Cl^{37}$ might interfere with, or dominate, the difference in molecular weight due to the uranium isotopes.

One method of separating the isotopes of uranium employing a gaseous mixture of uranium hexafluoride is by passing a mixture against a porous permeable membrane characterized by exceedingly fine pores. A portion of the gas flowed against said membrane passes through the pores thereof and another portion flows over and past the membrane. The portion passing through the membrane is found to be enriched with respect to $U^{235}$ and that flowing past the membrane is enriched with respect to $U^{238}$. Such membranes have been employed in plants for the diffusive separation of uranium isotopes. Because of the small separation which occurs when a gas is flowed against a membrane surface, the size of the plant and the requisite volume of gas required to operate it is extremely large. In the operation of a diffusion separation plant foreign gases become admixed with uranium hexafluoride because of accidents, reactions within the cascade, or because of slow inleakages from the atmosphere.

Diffusion plants are usually operated at reduced pressures in order to prevent uranium hexafluoride from condensing on the surfaces within the plant and to increase the mean free path of the molecules in the gas. The maintenance of reduced pressures (usually in the order on one-half atmosphere) results in the accumulation of inert or atmospheric gases within the plant from small leaks and gas seals. Quantities of fluorine and hydrogen fluoride are formed as reaction products of process gas with the metal surfaces of the plant and with moisture which may leak into the plant. Leaks sometimes develop in the cascade which admit moist air or coolant material such as $C_8F_{16}$ to the gaseous mixture within the plant. In order to remove such foreign gases from the plant, purge means are incorporated in the plant, which means are designed to selectively remove the uranium hexafluoride from the foreign gases. Such means include diffusion separation means separate from the main plant or diffusion cascade and condensation traps for separating the condensible from non-condensible gases. These means reduce the concentration of uranium hexafluoride in gas exhausted from the diffusion separation plant to relatively low values. Because of the extremely large volumes of gases exhausted from such diffusion plants, very considerable amounts of uranium hexafluoride are lost through the disposal of such waste gases even though the uranium hexafluoride concentration in the gas is relatively low.

A means for recovering uranium hexafluoride from gaseous mixtures in which it is present in relatively dilute concentrations must have certain properties. The means must be resistant to the corrosive action of uranium hexafluoride and to other fluorine containing gases which may be included in the gases exhausted from a diffusion separation plant. It must be capable of reducing the concentration of uranium hexafluoride in such gases to extremely low values. It is preferred that the means be relatively simple so that the recovered uranium hexafluoride may be easily handled. The means should be adaptable to recovery of uranium enriched with respect to $U^{235}$ isotope without danger of atomic explosion.

It is accordingly an object of the present invention to provide a means for recovering uranium hexafluoride from gaseous mixtures in which the uranium hexafluoride concentration is relatively low.

It is another object of the present invention to provide a means for recovering uranium hexafluoride from gaseous mixtures containing other corrosive gases.

It is still another object of the present invention to provide a means for reducing the concentration of uranium hexafluoride in said gas stream to extremely low values.

It is a further object of the present invention to provide a means for safely recovering uranium hexafluoride which has been enriched with respect to $U^{235}$ isotope from gaseous mixtures.

Other objects of the present invention will be in part obvious and in part pointed out hereinafter.

In general, the objects of the present invention may be achieved by adsorbing uranium hexafluoride from gaseous mixtures on activated carbon in such a manner as to prevent temperatures in excess of 400°F. from developing.

For purposes of convenience of expression, the material which is adsorbed on an adsorbent will be referred to as the adsorbate.

It has been found that the adsorption of uranium hexafluoride on activated carbon produces large temperature rises due to the heat of adsorption. Approximately 80,000 to 100,000 British Thermal Units are liberated per pound mole of uranium hexafluoride adsorbed. The increase in temperature due to the adsorption of uranium hexafluoride, if uncontrolled, causes reactions to occur between uranium hexafluoride and carbon. These reactions produce a caking in the adsorption bed and in the more severe instances such caking causes the adsorption bed to be blocked to the passage of gases therethrough.

It has been discovered that the reactions which produce blocking and caking proceed at appreciable rates only above 400°F. It has also been discovered that no chemical reaction occurs below 300°F. By the method of the present invention uranium hexafluoride is adsorbed on activated carbon in such a manner as to prevent the development of temperatures in excess of 400°F. Various alternative procedures may be employed for keeping the temperature below 400°F.

One procedure comprises employing independent cooling means in conjunction with the adsorption bed. The means employed will depend largely on the size of the adsorption bed which may be employed. The limiting factor in determining the size of an adsorption bed is the weight of uranium hexafluoride containing a known percentage of $U^{235}F_6$ which may be amassed in one spot before the critical mass is reached. For higher concentrations of $U^{235}$ isotope in the uranium hexafluoride adsorbed smaller adsorption beds must be employed. The following table gives the weights of uranium hexafluoride which may be adsorbed in a single container for corresponding percentage content of $U^{235}F_6$ in the adsorbed uranium hexafluoride.

| Percent $U^{235}F6$ | Safe Weight of $UF_6$ in Pounds |
|---|---|
| 2 | 200 |
| 9 | 17 |
| 15 | 8.7 |
| 25 | 4.6 |
| 36 | 3.0 |

The adsorption in a single container of weights of uranium hexafluoride considerably in excess of those given for corresponding percentages of $U^{235}F_6$ will be in excess of the critical mass and may result in atomic explosions. The weight of $UF_6$ adsorbed by a unit volume of activated carbon depends on the density and the activity of the carbon employed.

The activity of activated carbon is defined as the ratio of the weight of carbon tetrachloride adsorbed under standard conditions to the weight of the adsorbent on which it is adsorbed. The standard conditions for determining adsorbent activity are as follows:

Dry air is saturated with carbon tetrachloride at 0°C. and passed through a column of adsorbent which is 10 centimeters deep and has a volume of 15.7 cubic centimeters. The adsorbent bed is kept at 25°C. and the air containing carbon tetrachloride is passed therethrough at 786 cubic centimeters per minute until the adsorbent bed is saturated; i.e., until there is no increase in weight of the adsorbent bed. The weight of the adsorbate is divided by the weight of the adsorbent (prior to the adsorption) and multiplied by 100 to give the percent activity. Thus a gram of adsorbent, which adsorbs one gram of carbon tetrachloride, has an activity of 100 percent.

The quantity of uranium hexafluoride, in grams per gram of adsorbent, which is adsorbed on activated carbon having an activity of 70 to 75 percent for a corresponding time and temperature of adsorption may be obtained from FIG. 1. The partial pressure of uranium hexafluoride was 0.1 atmospheres and the adsorbent particle size was 6 to 8 mesh for the values given.

A second factor which controls the shape of the adsorption bed is the necessity for passing uranium hexafluoride through an appreciable depth of activated carbon in order to adsorb substantially all uranium hexafluoride. Substantially complete adsorption of uranium hexafluoride from a gas mixture is obtained at any pressure below one atmosphere and any temperature above 60°F. provided the gas mixture is passed through a bed of uranium hexafluoride of at least 18 inches in depth so as to contact each portion of the gas with the carbon for at least 3.5 seconds while passing through said bed. It is necessary to limit the size and shape of the container to that which will adsorb less than the critical quantity of $U^{235}$ and at the same time insure the passage of the gaseous mixture containing uranium hexafluoride through at least 18 inches of activated carbon.

The quantity of uranium hexafluoride adsorbed will depend on the activity of the adsorbent. For 6 to 8 mesh activated carbon having an activity of 70 to 75 percent a container 15¼ inches in diameter and nineteen inches deep is satisfactory for the adsorption of uranium hexafluoride enriched with $U^{235}F_6$ by as much as 35 percent. Conduits may be inserted in such a container which allow the passage of a cooling medium therethrough so as to carry off heat of adsorption resulting from the adsorption of uranium hexafluoride on carbon and thereby prevent the development of temperatures in excess of 400°F.

Another means for controlling the temperature developed in an adsorption bed during the adsorption of uranium hexafluoride therein comprises controlling the rate of adsorption of uranium hexafluoride. The adsorption of uranium hexafluoride from gaseous mixtures, in which the uranium hexafluoride concentration is less than 1 mole percent, by passing said gaseous mixture through the adsorbent bed at such a rate as not to adsorb more than two pounds per hour, will not produce excessive temperatures.

A third method of preventing the development of excessive temperatures comprises adsorbing a fluid inert to the corrosive action of uranium hexafluoride prior to the adsorption of uranium hexafluoride and subsequently replacing said adsorbed fluid by adsorbing uranium hexafluoride on said carbon.

In order to be suitable for the present method the corrosion resistant primary adsorbate must be susceptible to being replaced by uranium hexafluoride. Examples of such fluids are fluorocarbons such as $C_7F_{16}$, $C_8F_{16}$ and $C_{21}F_{44}$. The heat of adsorption generated by the adsorption of uranium hexafluoride and concurrent desorption of the previously adsorbed fluid is equal to the arithmetical difference of the heats of adsorption of these materials. The heat of adsorption produced in the preferential adsorption of uranium hexafluoride or replacement of the primary adsorbate is lower than the heat produced by direct adsorption, by the heat of adsorption of the quantity of primary adsorbate replaced.

The adsorbed uranium hexafluoride is strongly held on the activated carbon. The amount of desorption produced by pumping the adsorbent container or flowing inert gas therethrough was not measurable as it did not exceed the experimental error.

The adsorption of uranium hexafluoride is more efficient on particles of activated carbon having smaller diameters. The quantity of uranium hexafluoride adsorbed is also approximately proportional to the activity of the carbon. It is therefore preferred to use activated carbon of relatively high activity and of smaller particle size.

The FIGURE is a plot of the relation between the temperature of the adsorption bed and the weight of uranium hexafluoride adsorbed per unit weight of adsorbent for various periods of adsorption. It will be seen that a maximum occurs in the efficiency of the adsorbent for the adsorption of relatively short duration at about 300°F. Thus, if the adsorbent is to be used for adsorption for a period of less than six hours the optimum temperature for adsorption is approximately 300°F. In the adsorption procedures of shorter duration it is preferred to use particles of smaller size because the length of time in which saturation occurs increases with increasing particle size. Higher adsorption rates are effected for these short term adsorptions by maintaining the bed temperature at more than 500°F. but there is a danger of blocking the adsorption column due to the action between uranium hexafluoride and carbon at these temperatures, as pointed out above.

For adsorptions of relatively greater length the quantity of uranium hexafluoride adsorbed increases approximately as the temperature of the adsorption bed so as to make for more efficient adsorptions at higher temperatures. It is the preferred procedure in employing the present method to connect adsorption beds in series so as to increase the length of time during which uranium hexafluoride bearing gas mixture passes through a single bed.

It is obvious from the above description that the present method provides an efficient means for recovering uranium hexafluoride from gaseous mixtures particularly from mixtures in which they are present in relatively low concentrations. It also provides a method which may be adapted to various conditions of adsorption as, for example, it may be applied to the adsorption of traces of uranium hexafluoride in the order of 0.0001 mole percent from gas streams by adsorbing said uranium hexafluoride in relatively deep adsorption columns containing relatively small particles of adsorbent having high activity at such a rate as to maintain the temperature of said adsorption bed in the order of 400°F.

On the other hand, the present method may also be applied to the adsorption of uranium hexafluoride from gaseous mixtures in which the uranium hexafluoride is relatively concentrated (e.g., of the order of 10 percent), by passing said mixture through a series of relatively small adsorption beds having cooling means incorporated therewith, which adsorption beds contain relatively large particles of relatively low adsorption activity and maintaining the bed temperature at approximately 400°F.

The present method also provides a safe procedure for adsorbing uranium hexafluoride enriched with respect to the $U^{235}$ isotope over a wide range of concentrations of $U^{235}$.

The present method has much wider applicability than that of recovering uranium hexafluoride from waste gases exhausted from the diffusion-separation plant. For example, it may also be employed to adsorb uranium hexafluoride which is being separated from other metals which do not form relatively volatile fluorides. Thus, nickel and copper may be separated from uranium by treating these three metals with a fluorine-containing gas so as to form metal fluorides and heating said metal fluorides to distill off the more volatile uranium hexafluoride. The method of the present invention may be employed to advantage in recovering the uranium hexafluoride which is distilled from the metal fluoride mixture.

Uranium hexafluoride is a very effective fluorinating agent. For example, it has been used in fluorinating fluorochlorocarbons such as $FCl_2C.CCl_2F$. The reaction proceeds according to the following equation:

$$UF_6 + FCl_2C.CCl_2F \rightarrow 2CCl_2F_2 + UF_4$$

The method of the present invention may be employed in recovering unreacted uranium hexafluoride from the gaseous mixture of fluorochlorocarbons and uranium hexafluoride.

Since many embodiments might be made of the above described invention and since many changes might be made in the embodiment illustratively disclosed herein, it is to be understood that all matter hereinabove set forth is to be interpreted as illustrative only and not in a limiting sense, except as may be required by the appended claims.

I claim:

1. A method of recovering uranium hexafluoride from gaseous mixtures which comprises adsorbing said uranium hexafluoride on activated carbon.

2. A method of recovering uranium hexafluoride from gaseous mixtures which comprises passing the gas containing said uranium hexafluoride through an adsorption bed containing activated carbon so as to adsorb said uranium hexafluoride.

3. A method of recovering uranium hexafluoride from gaseous mixtures which comprises passing the gaseous mixture containing said uranium hexafluoride through the depth of an activated carbon adsorption bed of at least 18 inches in depth at a rate sufficient to keep each portion of said gaseous mixture in contact with adsorbent for at least 3.5 seconds.

4. A method of recovering uranium hexafluoride from gaseous mixtures which comprises passing the gaseous mixture containing said uranium hexafluoride through an activated carbon adsorption bed and maintaining said bed at less than 400°F.

5. A method of recovering uranium hexafluoride from gaseous mixtures which comprises passing the gaseous mixture containing said uranium hexafluoride through the depth of an activated carbon adsorption bed at least 18 inches in depth and maintaining said adsorption bed at less than 400°F.

6. A method of recovering uranium hexafluoride from gaseous mixtures which comprises passing the gaseous mixture containing said uranium hexafluoride through an activated carbon adsorption bed at such a rate as to prevent the development of temperatures in excess of 400°F.

7. A method of recovering uranium hexafluoride from gaseous mixtures which comprises passing the gaseous mixture containing said uranium hexafluoride through the depth of an adsorption bed of activated carbon of at least 18 inches in depth at such a rate as to prevent the development of temperatures in excess of 400°F.

8. A method of recovering uranium hexafluoride from gaseous mixtures which comprises passing for less than six hours a gaseous mixture containing said uranium hexafluoride through an activated carbon adsorption bed of relatively high activity maintained at 300°F.

9. A method of recovering uranium hexafluoride from gaseous mixtures which comprises preferentially replacing an adsorbate resistant to the corrosive action of uranium hexafluoride with uranium hexafluoride to recover the uranium hexafluoride at such a rate as to prevent the development of temperatures in excess of 400°F.

* * * * *